US012592988B2

(12) United States Patent
Meng et al.

(10) Patent No.: US 12,592,988 B2
(45) Date of Patent: Mar. 31, 2026

(54) MIDDLE FRAME ASSEMBLY, PREPARATION METHOD THEREOF, AND ELECTRONIC DEVICE

(71) Applicant: Honor Device Co., Ltd., Shenzhen (CN)

(72) Inventors: Yin Meng, Shenzhen (CN); Jing Gao, Shenzhen (CN); Cheng Jiang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 266 days.

(21) Appl. No.: 18/272,783

(22) PCT Filed: Jan. 3, 2023

(86) PCT No.: PCT/CN2023/070061
§ 371 (c)(1),
(2) Date: Jul. 17, 2023

(87) PCT Pub. No.: WO2023/185178
PCT Pub. Date: Oct. 5, 2023

(65) Prior Publication Data
US 2024/0388648 A1 Nov. 21, 2024

(30) Foreign Application Priority Data
Apr. 1, 2022 (CN) .......................... 202210339006.6

(51) Int. Cl.
*H01Q 1/24* (2006.01)
*H04M 1/02* (2006.01)

(52) U.S. Cl.
CPC ............ *H04M 1/026* (2013.01); *H01Q 1/243* (2013.01)

(58) Field of Classification Search
CPC .. H04M 1/026; H04M 1/0202; H04M 1/0266; H04M 1/185; H04M 1/0249; H04M 1/03; H04M 1/0283; H04M 1/22; H04M 1/0239; H04M 1/0274; H04M 19/04; H04M 2250/14
See application file for complete search history.

(56) References Cited

U.S. PATENT DOCUMENTS

2016/0359269 A1* 12/2016 Motohashi ......... G06K 13/0831
2020/0267874 A1* 8/2020 Yee ..................... H01L 23/3735
(Continued)

FOREIGN PATENT DOCUMENTS

CA 3076401 A1 4/2019
CN 102514206 A 6/2012
(Continued)

*Primary Examiner* — Alison Slater
(74) *Attorney, Agent, or Firm* — Leydig, Voit & Mayer, Ltd.

(57) ABSTRACT

Disclosed is a middle frame assembly, including a middle plate and a frame disposed around an outer edge of the middle plate, where the middle plate includes a first carbon fiber reinforced resin composite material base body and a first metal plating layer compounded on a surface of the base body. Some embodiments of this application further provide a preparation method for a middle frame assembly and an electronic device in the middle frame assembly. Some embodiments of this application use a carbon fiber reinforced resin composite material as a middle plate base body of the middle frame assembly.

19 Claims, 15 Drawing Sheets

(56) References Cited

U.S. PATENT DOCUMENTS

| | | | |
|---|---|---|---|
| 2020/0299894 A1 | 9/2020 | Liang et al. | |
| 2020/0314547 A1 * | 10/2020 | Kim | H04R 9/06 |
| 2021/0029835 A1 * | 1/2021 | Casey | H01R 13/2414 |
| 2022/0176677 A1 * | 6/2022 | Huang | B32B 27/08 |
| 2022/0329677 A1 | 10/2022 | Wu et al. | |
| 2024/0055762 A1 * | 2/2024 | Cai | H01Q 1/243 |

FOREIGN PATENT DOCUMENTS

| | | | | |
|---|---|---|---|---|
| CN | 105827759 A | * | 8/2016 | C04B 35/50 |
| CN | 106131255 A | | 11/2016 | |
| CN | 206004723 U | | 3/2017 | |
| CN | 109348031 A | | 2/2019 | |
| CN | 106714507 B | * | 9/2019 | H05K 9/0064 |
| CN | 113542458 A | | 10/2021 | |
| CN | 113747718 A | | 12/2021 | |
| CN | 114040587 A | | 2/2022 | |
| CN | 114075344 A | | 2/2022 | |
| CN | 114466094 A | | 5/2022 | |
| WO | 2021047659 A1 | | 3/2021 | |
| WO | WO-2021037029 A1 | * | 3/2021 | G06F 1/1633 |

* cited by examiner

MIDDLE FRAME ASSEMBLY, PREPARATION METHOD THEREOF, AND ELECTRONIC DEVICE

CROSS-REFERENCE TO RELATED APPLICATIONS

This application is a national stage of International Application No. PCT/CN2023/070061, filed on Jan. 3, 2023, which claims priority to Chinese Patent Application No. 202210339006.6, filed on Apr. 1, 2022. The disclosures of both of the aforementioned applications are hereby incorporated by reference in their entireties.

TECHNICAL FIELD

This application relates to the field of electronic device technologies, and in particular, to a middle frame assembly, a preparation method thereof, and an electronic device.

BACKGROUND

For a common user, a weight of a mobile phone is approximately in a range of 150 g to 200 g, and a thickness is less than 9 mm, which has a more comfortable hand feeling. Excessive weight leads to an uncomfortable hand feeling, especially with an increase of use time, the discomfort increases. The main factors affecting the weight of the mobile phone include a mobile phone size, a body material, a battery capacity, and a functional module. With an increase in the mobile phone size, the battery capacity, and the functional module, the weight of the mobile phone gradually increases. Therefore, currently, a selection of a material of a mobile phone housing is one of the research directions of a mobile phone lightweight.

Metal alloys such as magnesium alloy, stainless steel, aluminum alloy, and zinc alloy are commonly used in a middle frame of the mobile phone. Using plastics with high strength and high toughness, such as glass fiber reinforced polyurethane (PC+GF), instead of the metal alloys can reduce the weight of the mobile phone, but the plastics cause a dielectric constant and loss tangent of the middle frame to become larger, which has an impact on a function of antennas.

SUMMARY

This application provides a middle frame assembly, a preparation method thereof, and an electronic device, which resolves a problem that reducing a weight of the electronic device and maintaining a function of the antenna cannot be simultaneously implemented.

To achieve the foregoing objective, this application provides the following technical solutions: a middle frame assembly, including a middle plate and a frame disposed around an outer edge of the middle plate, where the middle plate comprises a first carbon fiber reinforced resin composite material base body and a first metal plating layer compounded on a surface of the base body.

The embodiments of this application use a carbon fiber reinforced resin composite material, for example, a carbon fiber reinforced epoxy resin composite material, a carbon fiber reinforced phenolic resin composite material, or a carbon fiber reinforced polytetrafluoroethylene resin composite material, as a middle plate base body of the middle frame assembly, which significantly reduces a weight of the middle frame assembly and has advantages of good rigidity and high strength. In addition, the metal plating layer compounded on the surface of the carbon fiber reinforced resin composite material base body resolves problems of a wave absorption effect and a PIM of the carbon fiber reinforced resin composite material, so that an antenna function of the electronic device is not affected.

In some possible implementations, a thickness of the first metal plating layer is greater than or equal to a skin depth of the first metal plating layer. Further, when a resistivity of the first metal plating layer is $1 \times 10^{-4}$ ohm·cm or below; or even in a range of $1 \times 10^{-5}$ ohm·cm to $1 \times 10^{-8}$ ohm·cm, and is close to a resistivity of a metal middle plate, for example, an aluminum alloy middle plate, an antenna performance is not lost.

In some embodiments, to prevent the first metal plating layer on the middle plate from falling off, the middle plate further includes a protective layer compounded on a surface of the first metal plating layer. The protective layer may be formed on the surface of the first metal plating layer through surface coating treatment, passivation liquid treatment, spraying, anodic oxidation, micro-arc oxidation, or electrophoresis, to prevent the first metal plating layer from falling off under a larger pressure.

In some embodiments, to prevent the first metal plating layer from falling off, the first metal plating layer may be partially compounded on the carbon fiber reinforced resin composite material base body on the middle plate, for example, the first metal plating layer is compounded on a part of the carbon fiber reinforced resin composite material base body that is not connected to the frame. In addition, a through hole is provided on the carbon fiber reinforced resin composite material base body, and a second metal plating layer is compounded on a surface of the through hole to implement electricity continuity of an upper surface and a lower surface of the carbon fiber reinforced resin composite material base body. Alternatively, the first metal plating layer is compounded on a part of the carbon fiber reinforced resin composite material base body that is not connected to the frame, after the frame is connected to the middle plate, a second metal plating layer is compounded on a part of the carbon fiber reinforced resin composite material base body that is connected to the frame, to implement electricity continuity and prevent the first metal plating layer from falling off.

In some possible implementations, the middle frame assembly further includes an antenna radiator, and the antenna radiator may be formed from at least a portion of a frame body of a metallized frame (that is, the antenna radiator is disposed on an outer surface of the frame), or may be disposed on a side of the frame facing a middle plate (that is, the antenna radiator is disposed on an inner surface of the frame). The antenna radiator may be electrically connected to the first metal plating layer on the middle plate through a conductive layer or a conductive auxiliary material, for example, a metal elastic piece, a metal gasket, a conductive fabric, a conductive adhesive, or a conductive foam, to implement grounding of the antenna radiator.

In other possible implementations, the antenna radiator may not be electrically connected to the middle plate, but when used in an electronic device, the antenna radiator may be electrically connected to a screen component or a printed circuit board of the electronic device to implement grounding of the antenna radiator. When the antenna radiator is electrically connected to the printed circuit board, a wire may be arranged on the printed circuit board to implement the grounding of the antenna radiator, which saves costs of a structure.

In some possible implementations, both a middle plate and a frame are formed of a carbon fiber reinforced resin composite material compounded with a metal plating layer, which can further reduce weights of a middle frame assembly and an electronic device.

The embodiments of this application further provide a preparation method for a middle frame assembly, including the following steps:

providing a carbon fiber reinforced resin composite material base body;

compounding a first metal plating layer on a surface of the carbon fiber reinforced resin composite material base body to obtain a middle plate; and providing a frame material, and connecting the frame material to the middle plate to obtain a middle frame assembly.

In some possible implementations, a middle frame assembly may be formed by performing metallized surface treatment on a carbon fiber reinforced resin composite material base body. The metallized surface treatment includes, but is not limited to, spraying, metal spray pattern (MSP), printing direct structuring (which is also referred to pad printing or printing direct structuring (PDS)), laser direct structuring (LDS), laser-activating-plating (LAP), or chemical plating.

In some possible implementations, a frame of a middle plate may be connected in a mechanical manner such as welding, or clamping, to form a middle frame assembly. In some possible implementations, to simplify a process and improve performance, a middle plate and a frame material may further be connected through integral injection molding, for example, a nano molding technology (NMT) or a metal device antenna (MDA), to form a middle frame assembly.

The embodiments of this application further provide an electronic device, including the middle frame assembly in the technical solutions. The electronic device not only has a light weight, but also has no impact on the antenna performance.

In some possible embodiments, in an electronic device, an antenna radiator is electrically connected to a middle plate. In some other possible embodiments, an antenna radiator may be electrically connected to a screen component or a printed circuit board, which saves costs of a structure.

In the embodiments of this application, a carbon fiber reinforced resin composite material with a metal plating layer compounded on a surface is used as a main material of a middle frame assembly, which not only implements a lightweight of an electronic device, but also has no impact on an antenna function of the electronic device.

4

Figure 7:
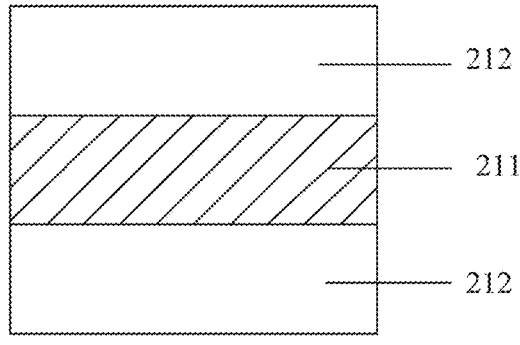
Figure 8:
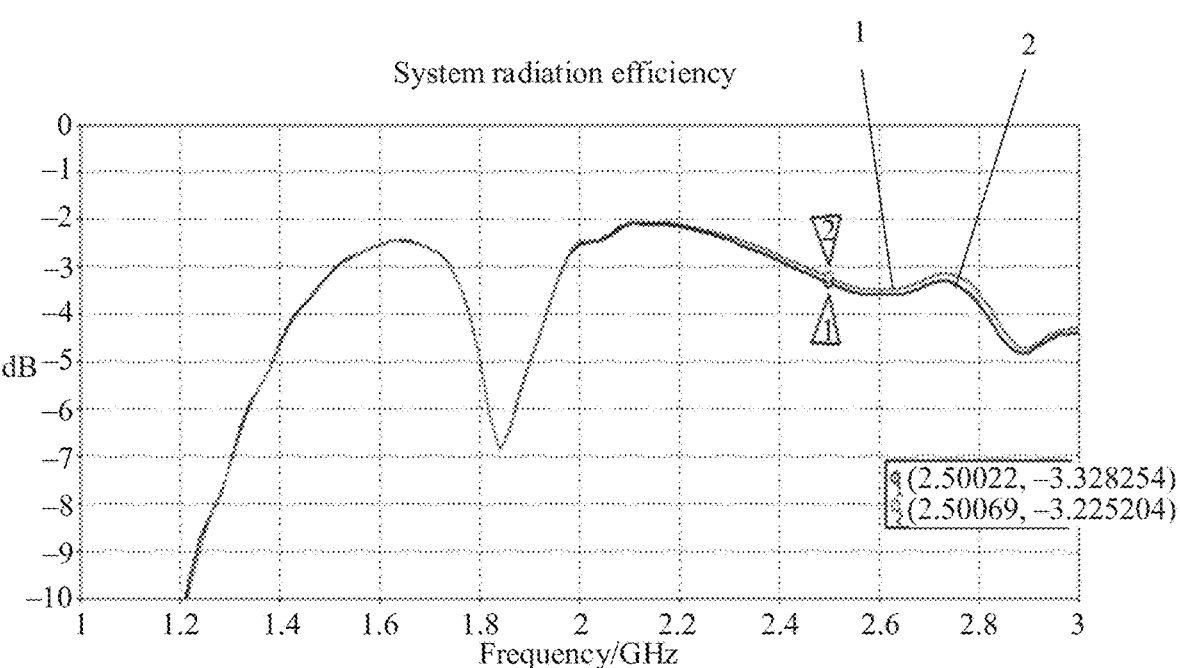
Figure 9:
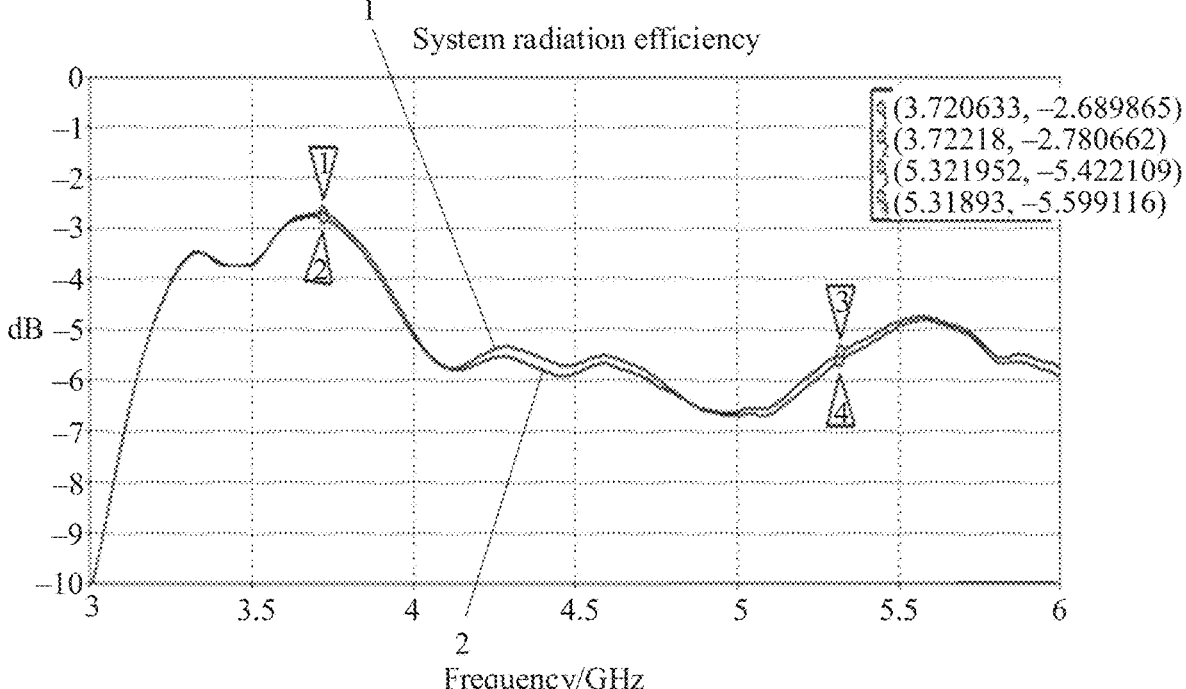
Figure 10:
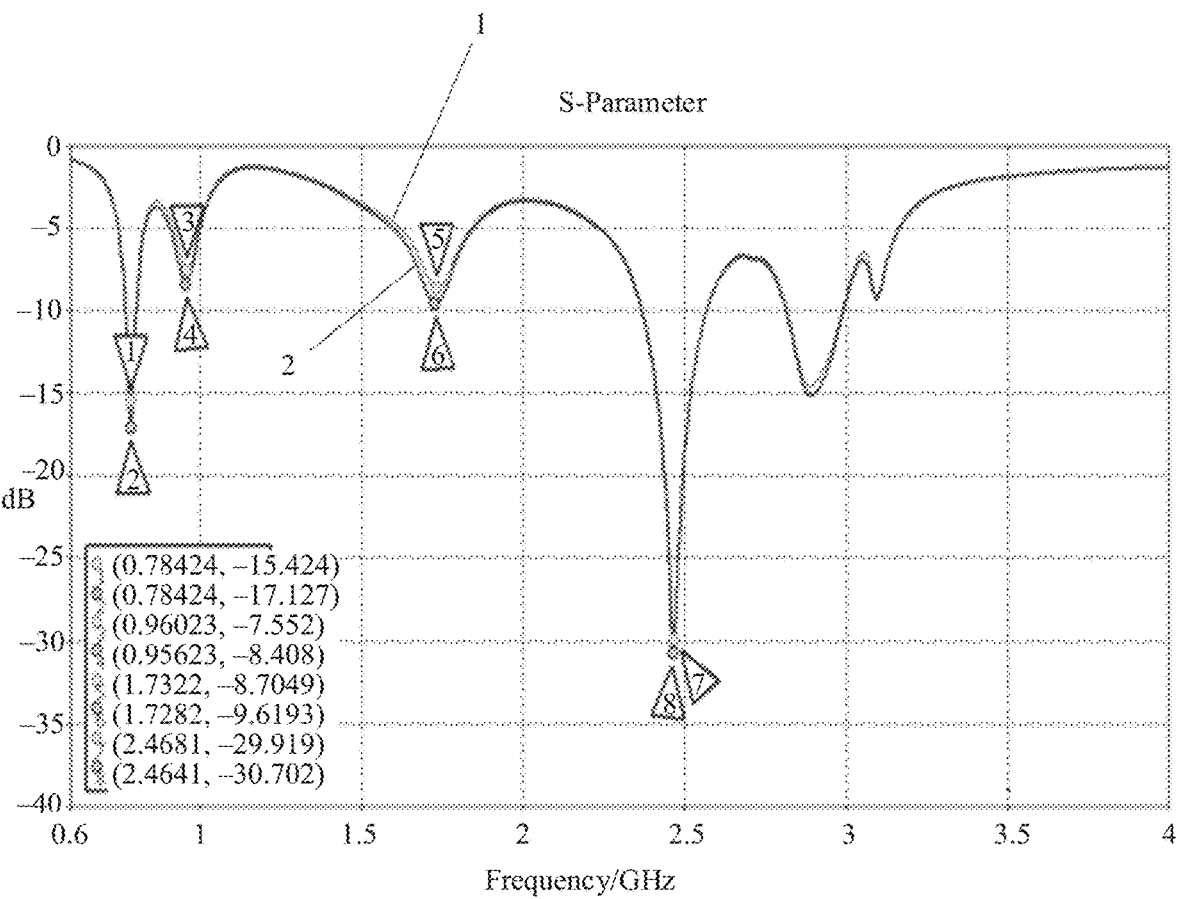
Figure 11:
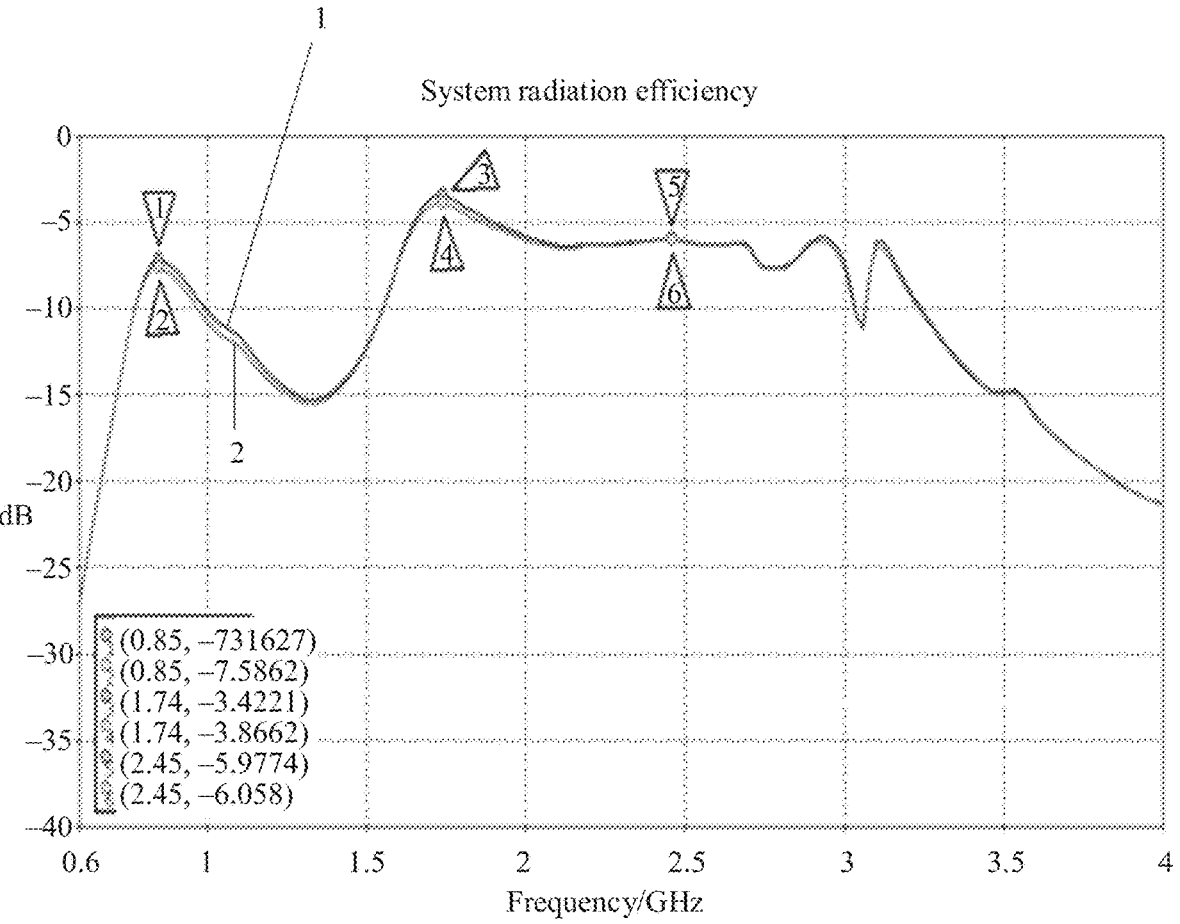
Figure 12:
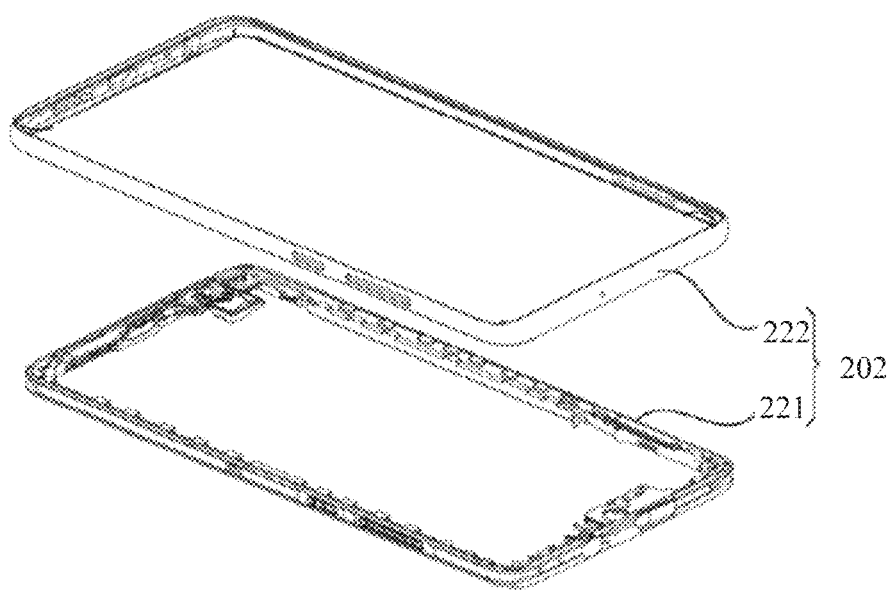
Figure 13:
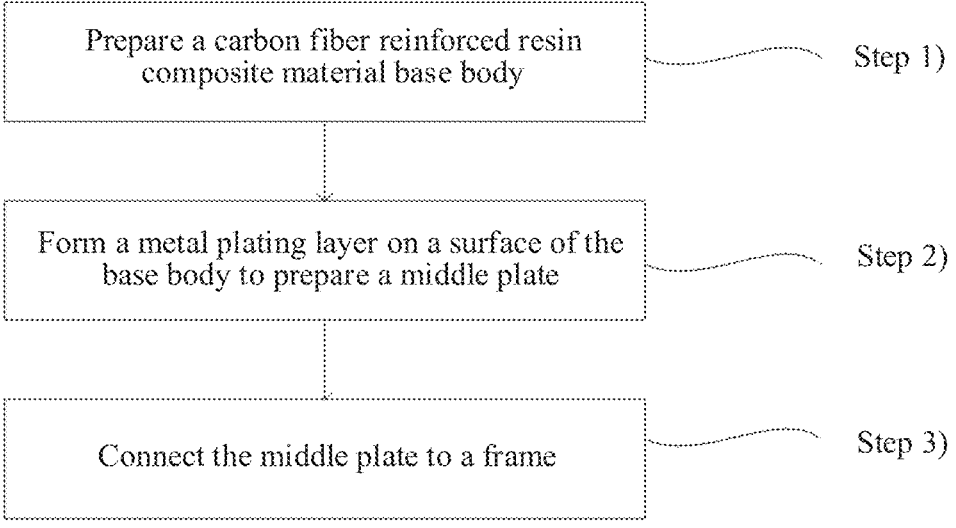
Figure 14:
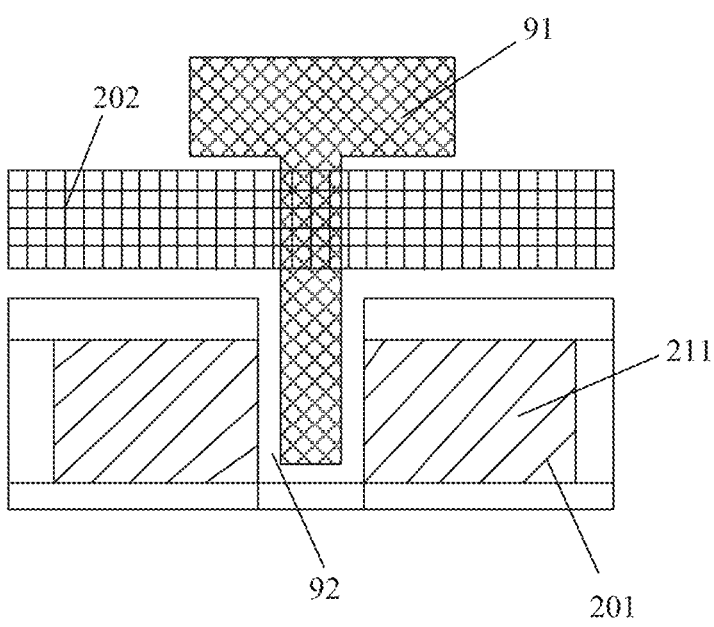
Figure 15:
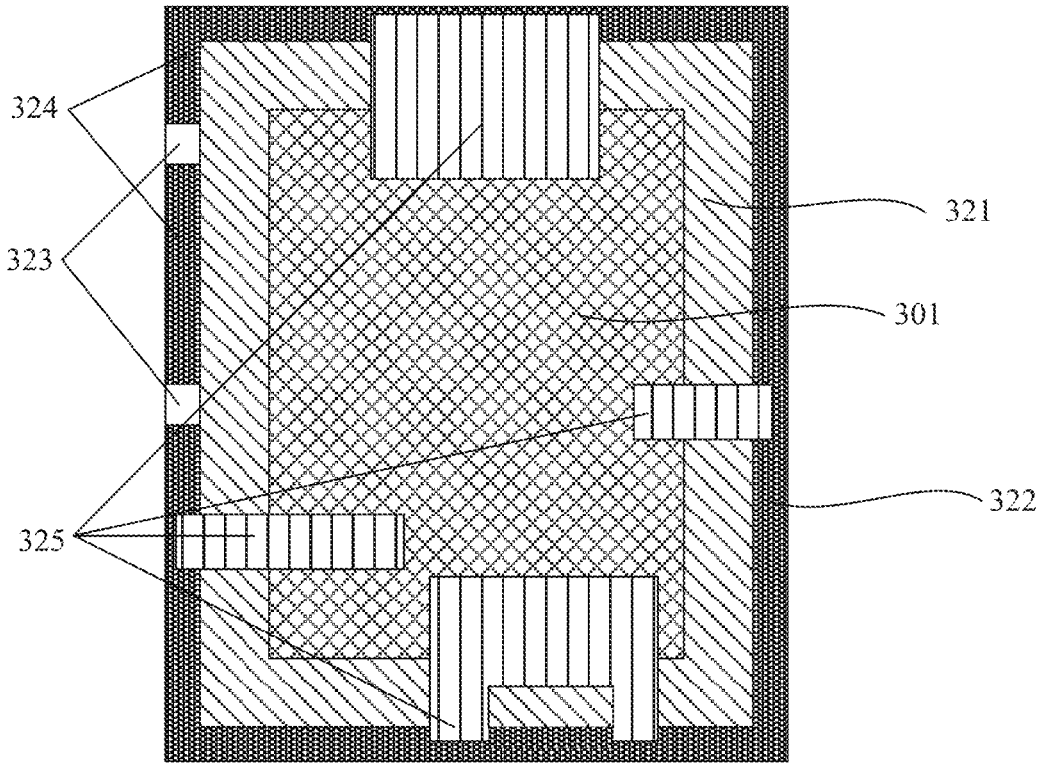
Figure 16:
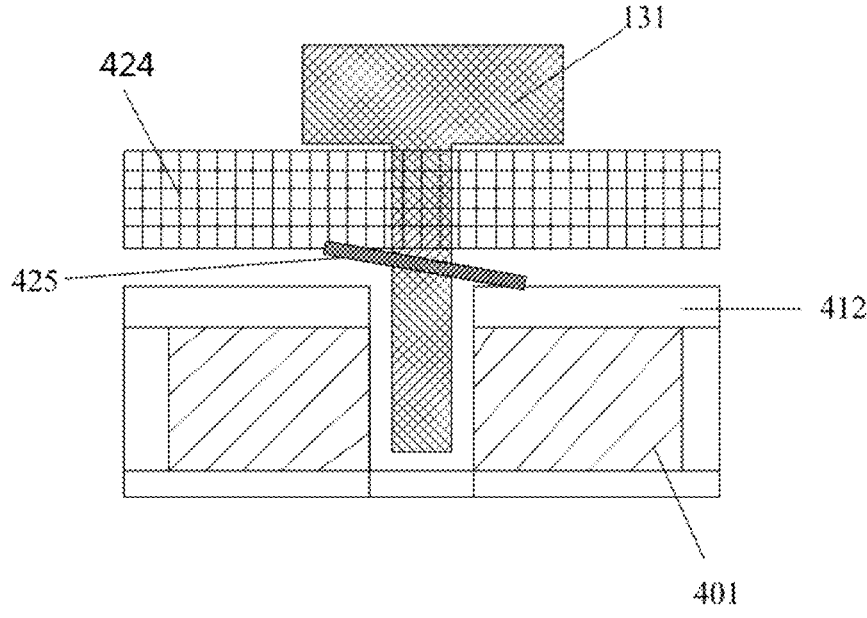
Figure 17:
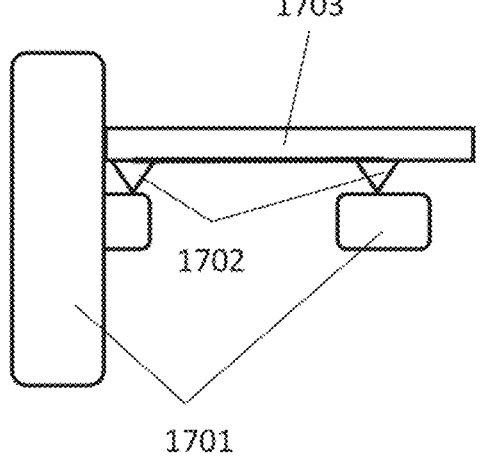
Figure 18:
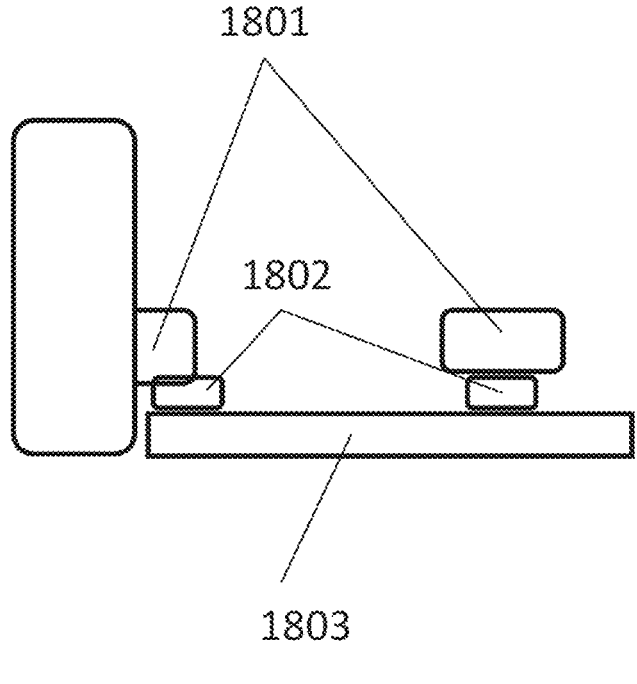
Figure 19:
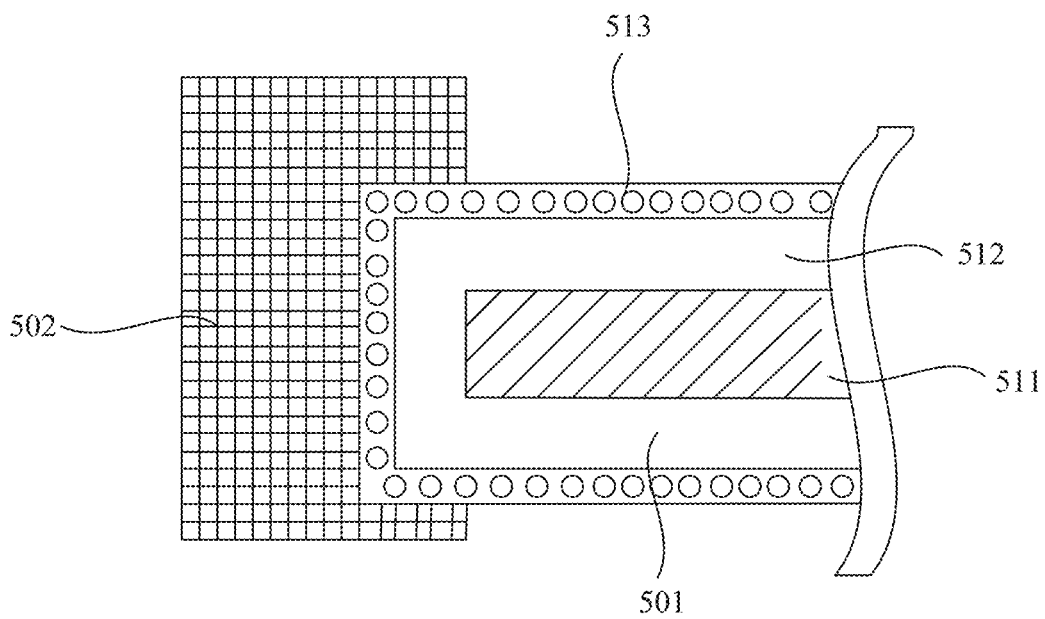
Figure 20:
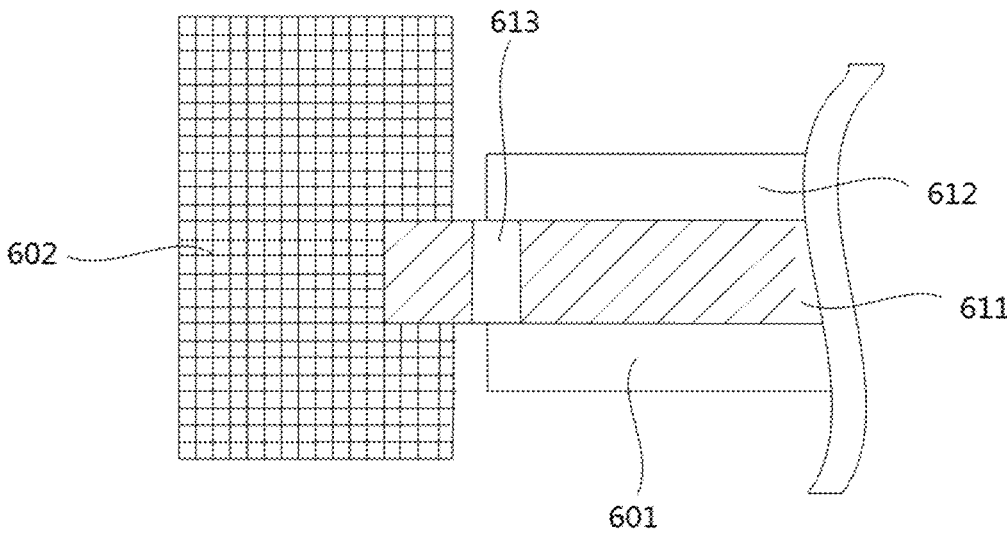
Figure 21:
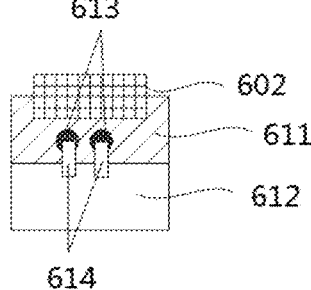
Figure 22:
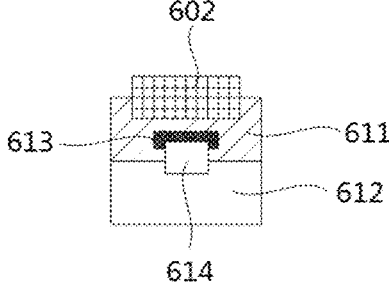
Figure 23:
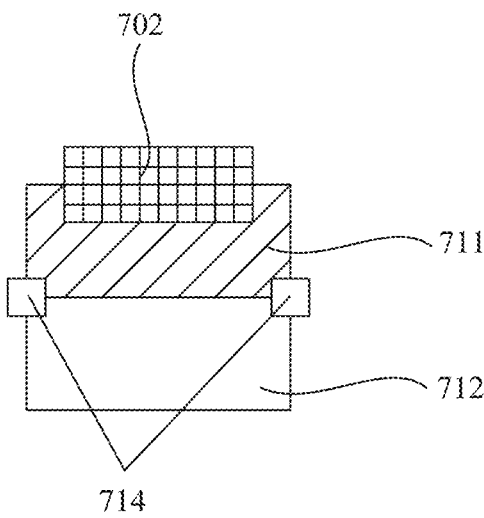
Figure 24:
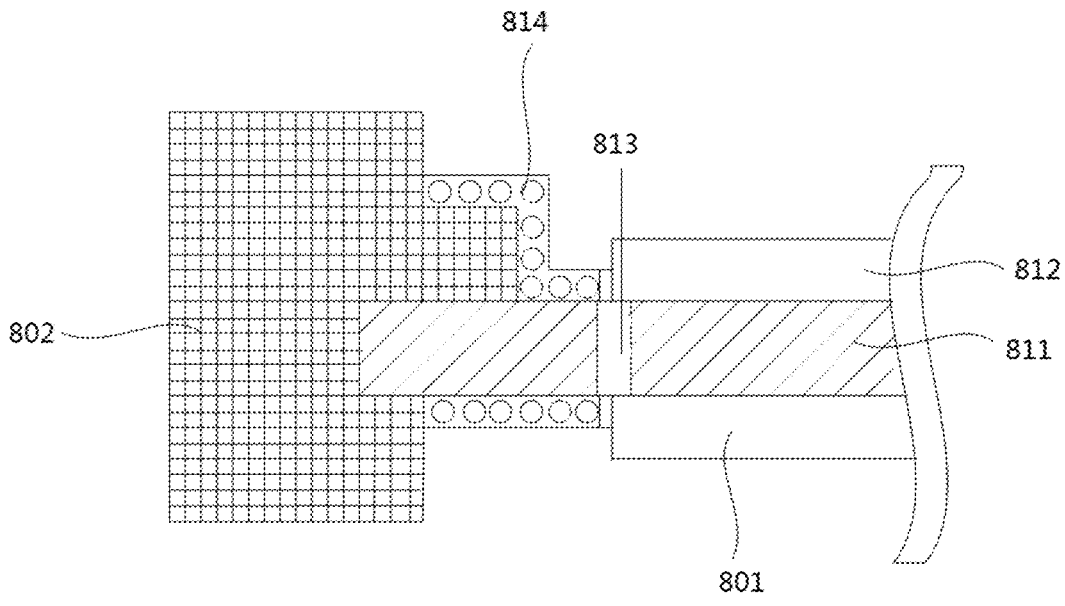
Figure 25:
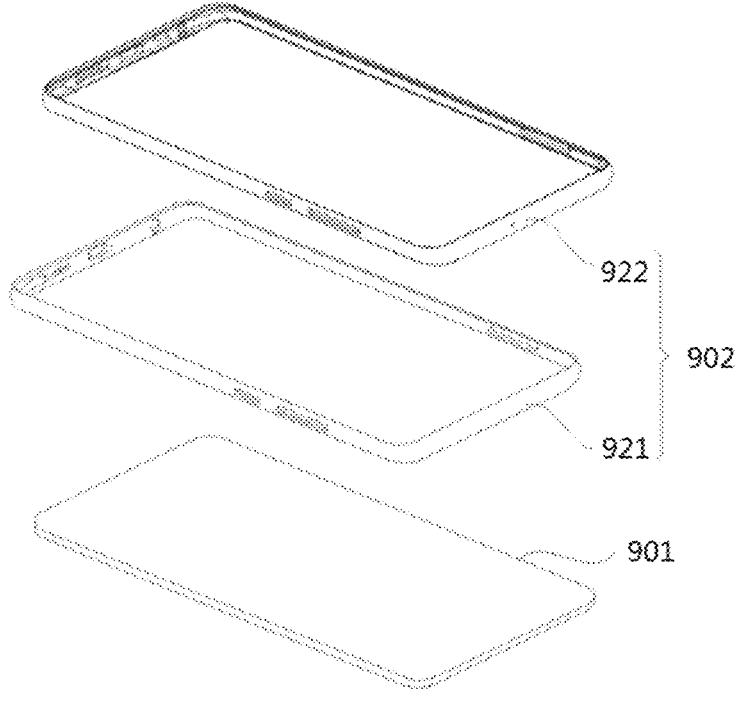

FIG. 7 is a schematic diagram of a laminated structure of a middle plate according to an embodiment of this application;

FIG. 8 is a system radiation efficiency curve of a metal plating layer and a metal material in a range of 1 GHz to 3 GHz;

FIG. 9 is a system radiation efficiency curve of a metal plating layer and a metal material in a range of 3 GHz to 6 GHz;

FIG. 10 is a S-parameters curve of a silver plating layer and a metal material in a range of 0.6 GHz to 4 GHZ;

FIG. 11 is a system radiation efficiency curve of a silver plating layer and a metal material in a range of 0.6 GHz to 4 GHz;

FIG. 12 is a schematic structural diagram of a frame according to an embodiment of this application;

FIG. 13 is a flowchart of a preparation process of a middle frame assembly according to an embodiment of this application;

FIG. 14 is a schematic structural diagram of a connection of a middle frame assembly according to an embodiment of this application;

FIG. 15 is a schematic structural exploded view of a middle frame assembly according to a second embodiment of this application;

FIG. 16 is a schematic diagram of a cross-sectional structure of a middle frame assembly according to a third embodiment of this application;

FIG. 17 is a schematic diagram of a connection between an antenna radiator and a PCB according to an embodiment of this application;

FIG. 18 is a schematic diagram of a connection between an antenna radiator and a screen component according to an embodiment of this application;

FIG. 19 is a schematic structural exploded view of a middle frame assembly according to a fourth embodiment of this application;

FIG. 20 is a schematic structural exploded view of a middle frame assembly according to a fifth embodiment of this application;

FIG. 21 is a schematic structural diagram of a first electrical connection of a middle plate according to an embodiment of this application;

FIG. 22 is a schematic structural diagram of a second electrical connection of a middle plate according to an embodiment of this application;

FIG. 23 is a schematic structural diagram of a third electrical connection of a middle plate according to an embodiment of this application;

FIG. 24 is a schematic structural diagram of a fourth electrical connection of a middle plate according to an embodiment of this application; and FIG. 25 is a schematic structural diagram of a middle frame assembly according to a sixth embodiment of this application.

DESCRIPTION OF EMBODIMENTS

The following clearly and completely describes technical solutions in embodiments of this application with reference to the accompanying drawings in the embodiments of this application. Terms used in the following embodiments are merely intended for describing specific embodiments, but are not intended to limit this application. As used in the specification of this application and the appended claims, singular expressions "one", "a/an", "the", "the foregoing", and "this" are intended to also intended to include, for example, an expression "one or more" unless expressly indicated to the contrary in the context. It should be further understood that in the embodiments of this application, "one or more" refers to one, two, or more than two.

Reference to "an embodiment" or "some embodiments", or the like described in the specification of this application means that particular features, structures, or characteristics described with reference to the embodiment are included in one or more embodiments of this application. Therefore, the statements "in one embodiment", "in some embodiments", "in some other embodiments", "in still some other embodiments" appearing at different positions in this specification do not necessarily refer to the same embodiment, but mean "one or more but not all embodiments", unless otherwise particularly emphasized in other ways. The terms "comprise", "include", "have", and variations thereof all mean "include but is not limited to", unless otherwise specially emphasized.

In the embodiments of this application, words such as "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. To be precise, the use of the words such as "exemplary" or "for example" is intended to present a related concept in a specific manner.

Figure 1:
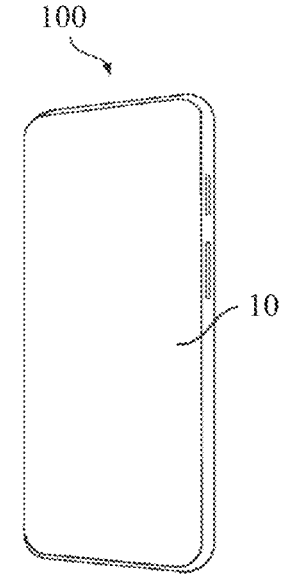
FIG. 1 is a three-dimensional schematic structural diagram of a mobile phone.
Figure 2:
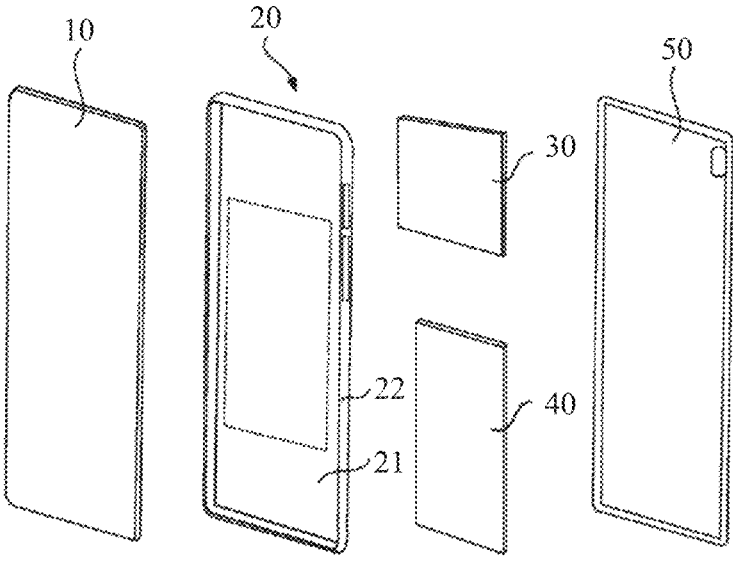
FIG. 2 is a schematic structural exploded view of a mobile phone.

In the embodiments of this application, an example in which a mobile phone 100 is the electronic device is used for description. As shown in FIG. 1 and FIG. 2, FIG. 1 is a three-dimensional schematic structural diagram of the mobile phone, and FIG. 2 is a schematic structural exploded view of the mobile phone. The mobile phone 100 mainly includes a display module 10, a middle frame assembly 20, and a rear housing 50, and the middle frame assembly 20 is located between the display module 10 and the rear housing 50. The display module 10 is configured to display an image, and the rear housing 50 is connected to the middle frame assembly 20 to form an accommodation cavity for accommodating an electronic device, for example, a printed circuit board, a camera, or a battery. The printed circuit board 30 and the battery 40 may further be arranged on the middle frame assembly 20. For example, the printed circuit board It may be understood that, a structure illustrated in the embodiments of this application does not constitute a specific limitation on the mobile phone 100. In some other embodiments of this application, the mobile phone 100 may include more or fewer components than those shown in the figure, or combine some components, or split some components, or have a different component arrangement. For example, the mobile phone 100 may further include components such as a camera, including a front-facing camera and a rear-facing camera, and a flash.

Figure 3:
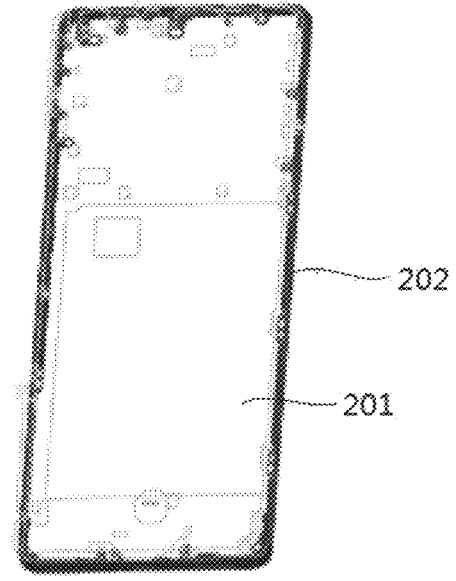
FIG. 3 is a three-dimensional schematic structural diagram of a middle frame assembly according to an embodiment of this application.
Figure 4:
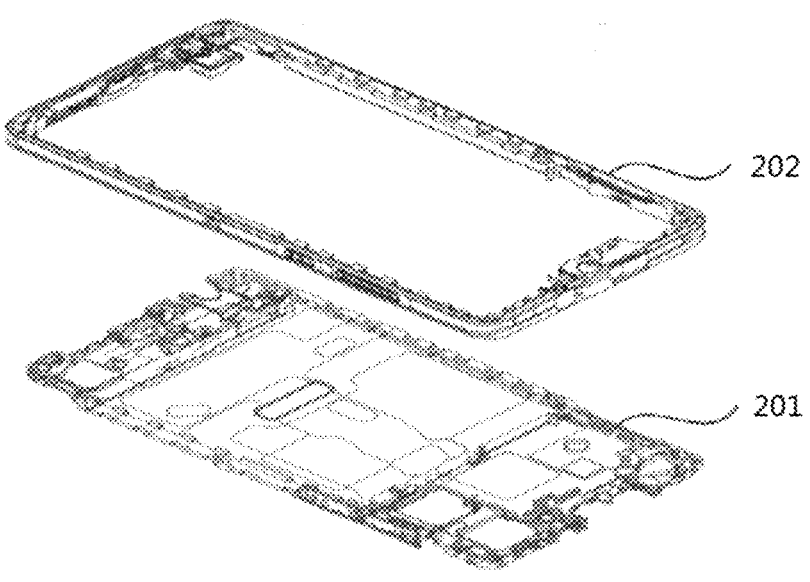
FIG. 4 is a schematic structural exploded view of a middle frame assembly according to an embodiment of this application.

In a first embodiment of this application, a middle frame assembly 20 includes a middle plate 201 and a frame 202 disposed around an outer edge of the middle plate. As shown in FIG. 3 and FIG. 4, FIG. 3 is a three-dimensional schematic structural diagram of a middle frame assembly according to an embodiment of this application, and FIG. 4 is a schematic structural exploded view of a middle frame assembly according to an embodiment of this application. To reduce a weight of the mobile phone, the middle plate 201 may be made of a plastic with high strength and high toughness such as a carbon fiber reinforced resin composite material instead of a metal such as an aluminum alloy.

The carbon fiber reinforced resin composite material has advantages of high strength, high toughness, and low specific gravity, where a carbon fiber is a special fiber composed of carbon, and carbon content of the carbon fiber varies with different types, and is generally 90% or more. The carbon fiber has characteristics of a common carbon material, for example, high temperature resistance, friction resistance, electrical conduction, heat conduction, and corrosion resistance, but a difference from the common carbon material is that the appearance of the carbon fiber is obviously anisotropic and soft, and the carbon fiber may be processed into various fabrics. The carbon fiber may be processed into fabrics, felt, mats, tapes, paper and other materials, which are generally added into resin, metal, ceramics, concrete, and other materials as reinforcing materials to form composite structural materials. The carbon fiber reinforced resin composite material has comprehensive indexes such as a high specific strength and a specific modulus, and becomes a commonly used material in aerospace field because of advantages of small specific gravity, good rigidity, and high strength. Table 1 is a performance comparison between a carbon fiber reinforced resin composite material and other materials.

TABLE 1

| A performance comparison between a carbon fiber reinforced resin composite material and other materials | | | | |
|---|---|---|---|---|
| Material | Density (g/cm$^3$) | Tensile strength (MPa) | Tensile modulus (GPa) | Coefficient of linear expansion (μm/m · K) |
| 304 stainless steel | 7.9 | 520 | 200 | 16.5 |
| 6 series aluminum alloy | 2.7 | 250 to 420 | 68 | 23.6 |
| 7 series aluminum alloy | 2.8 | 450 | 70 | 67.0 |
| Magnesium alloy | 1.8 | 160 to 300 | 44.8 | 22 |
| carbon fiber reinforced resin composite material | 1.75 | 1800 | 130 | 0.8 |

30 and the battery 40 are arranged on a surface of the middle frame 20 facing the rear housing 50, or arranged on a surface of the middle frame 20 facing the display module 10. When the printed circuit board 30 is arranged on the middle frame 20, an opening may be formed on the middle frame 20 for placing an element on the printed circuit board 30 at the opening of the middle frame 20.

Figure 5:
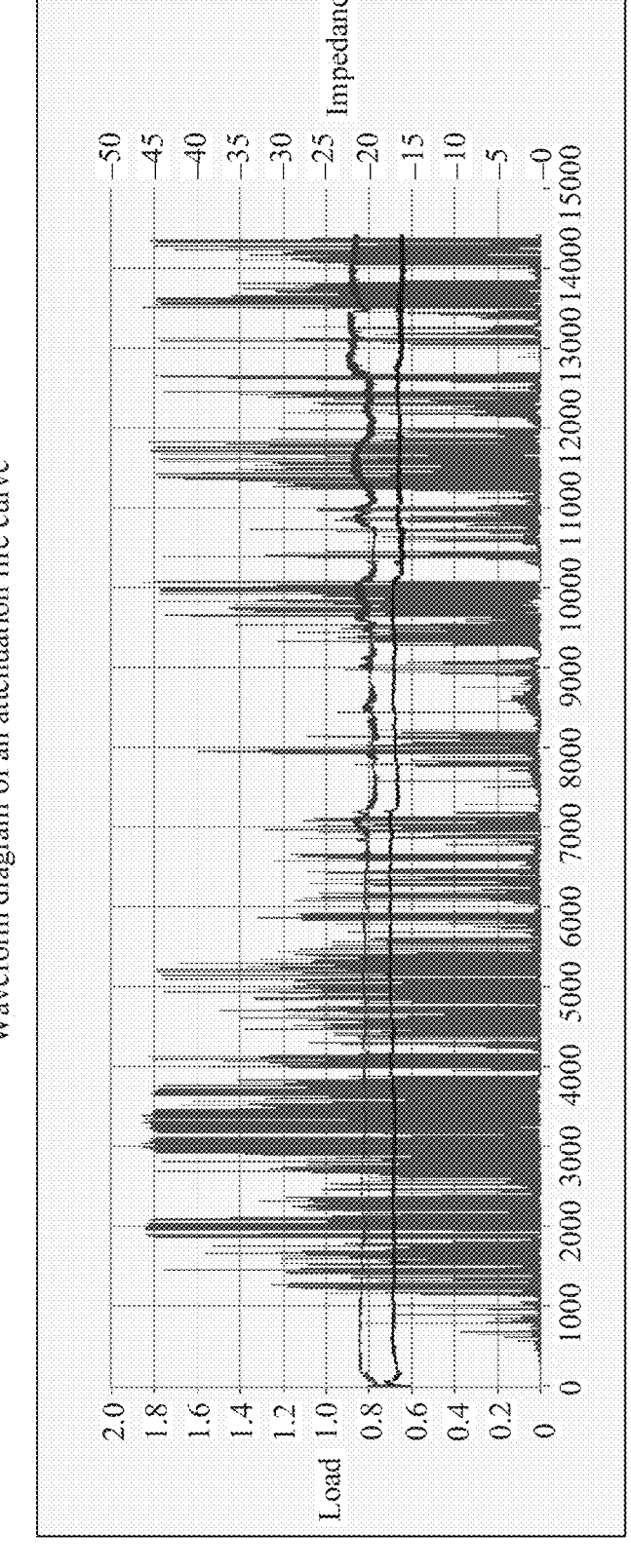
FIG. 5 is a waveform diagram of an attenuation life curve of a fretting wear resistance test of a magnesium alloy.
Figure 6:
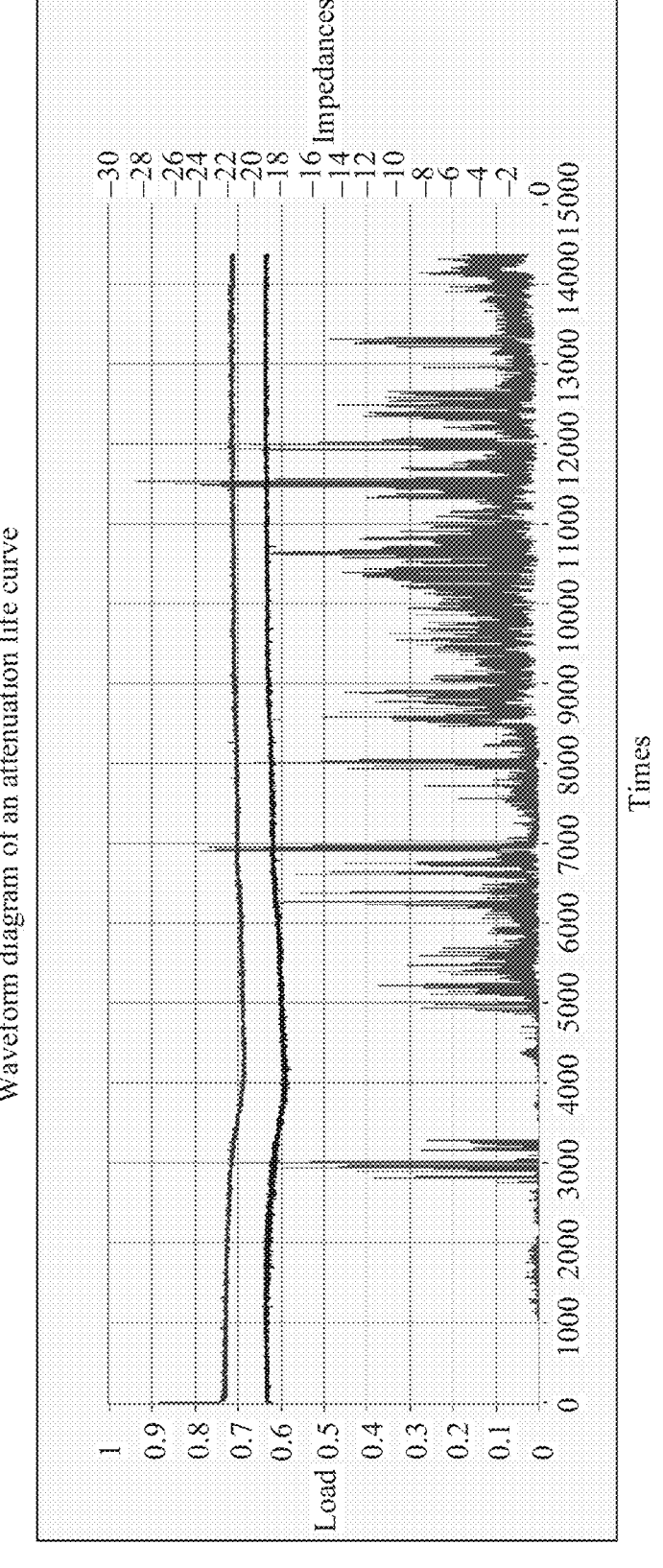
FIG. 6 is a waveform diagram of an attenuation life curve of a fretting wear resistance test of an aluminium magnesium alloy.

A magnesium alloy also has low density, and can implement a lightweight of an electronic device. However, the magnesium alloy is unstable, and electrochemical corrosion occurs at normal temperature, resulting in function failure and non-wear resistance. As shown in FIG. 5 and FIG. 6, FIG. 5 is a waveform diagram of an attenuation life curve of a fretting wear resistance test of a magnesium alloy (there are 14427 tests), and FIG. 6 is a waveform diagram of an attenuation life curve of a fretting wear resistance test of an aluminium magnesium alloy (there are 14379 tests). When fretting is performed on the magnesium alloy for about 1000 times, an impedance starts to rise from 1 ohm to about 20 ohm. With the surface wear of laser engraving, powder continues to accumulate. When the fretting is performed on the magnesium alloy for about 2000 times, the impedance rises to about 45 ohm, and when the fretting is performed on the magnesium alloy for about 6000 times to 9000 times, with the powder being cut by a ball head, the impedance gradually decreases. As the friction continues, new powder is formed, and after 9000 times, the impedance returns to 40 ohm+. Compared with a conventional aluminum alloy, rise time of the impedance is short, and an absolute value of the impedance is doubled.

The density of the carbon fiber reinforced resin composite material is only 22% of the stainless steel and 63% of the aluminum alloy, the strength of the carbon fiber reinforced resin composite material is close to 3 times of the stainless steel and 4 times of the aluminum alloy, and the carbon fiber reinforced resin composite material has a low linear expansion coefficient and high size accuracy; The carbon fiber reinforced resin composite material has good corrosion resistance. The carbon fiber reinforced resin composite material is inert in an alkaline environment and has good corrosion resistance to organic solvents, acids, alkalis, and the like, which is suitable for replacing metal materials to implement the lightweight of the electronic device. However, the carbon fiber reinforced resin composite material has a characteristic of hysteresis and a serious passive intermodulation (PIM) problem is caused when the carbon fiber reinforced resin composite material is directly used as the middle frame material. Table 2 is an equivalent dielectric constant and a magnetic permeability of a carbon fiber reinforced resin composite material (e.g., Carbon Fiber Reinforced Polymer/Plastic (CFRP)).

TABLE 2

| Equivalent dielectric constant ε and magnetic permeability μ of a transverse CFRP | | | | |
| --- | --- | --- | --- | --- |
| f/GHz | ε' | ε" | μ' | μ" |
| 8 | 11.32 | 14.88 | 1.29 | 0 |
| 9 | 11.42 | 14.36 | 1.16 | 0 |
| 10 | 11.33 | 12.88 | 1.02 | 0 |
| 11 | 11.28 | 11.86 | 1.00 | 0 |
| 12 | 11.00 | 11.66 | 0.93 | 0 |

In this application, a carbon fiber reinforced resin composite material is used as a main material of a middle frame, and at the same time, a surface of the carbon fiber reinforced resin composite material is performed metallization to form a metal plating layer, so as to resolve problems of a wave absorption effect and a PIM of the carbon fiber reinforced resin composite material. Table 3 is power values of second harmonic and third harmonic of a carbon fiber reinforced resin composite material and a carbon fiber reinforced resin composite material with a nickel plated surface under a same scenario.

TABLE 3

| Performance parameters of a carbon fiber reinforced resin composite material with surface metallization and a carbon fiber reinforced resin composite material without surface metallization | | | | | |
| --- | --- | --- | --- | --- | --- |
| Test items | | Second harmonic H2 (dBm) | Third harmonic H3 (dBm) | Resistance (two-wire method) Ω | Coupling testing (dBm) |
| Nickel-plated sample | Sample 1 | Ground noise (GSM900) | Ground noise (GSM900) | 0.5 to 1.2 | Nickel-plated sample |
| | Sample 2 | Ground noise (GSM1800) | Ground noise (GSM1800) | 0.5 to 1.2 | H2, H3 ground noise (GSM1800) |
| Non-nickel-plated sample | Sample 1 | −55 (GSM900) | −51 (GSM900) | 80, 220, 460 | Non-nickel-plated sample |
| | Sample 2 | −68 (GSM1800) | −63 (GSM1800) | 80, 220, 460 | H2: −70; H3: −65 (GSM1800) |

In Table 3, non-nickel-plated sample 1 is a continuous carbon fiber phenolic resin composite material, and non-nickel-plated sample 2 is the same as sample 1. Nickel-plated sample 1 is the non-nickel-plated sample 1 compounded with a nickel layer with a thickness of 1 μm, and nickel-plated sample 2 is the non-nickel-plated sample 2 compounded with a nickel layer with a thickness of 1 μm.

Based on this, the middle plate 201 provided in the embodiments of this application includes a carbon fiber reinforced resin composite material base body 211 and a metal plating layer 212 compounded on a surface of the base body. As shown in FIG. 7, FIG. 7 is a schematic diagram of a laminated structure of a middle plate according to an embodiment of this application. The carbon fiber reinforced resin composite material base body 211 has characteristics of high strength, high toughness, and low specific gravity, which can significantly reduce the weight of the electronic device. The metal plating layer 212 can resolve problems of a wave absorption effect and a PIM of the base body 211, so that an antenna function of the electronic device is not affected. The middle plate 201 may be provided with an opening for placing an element on the circuit board at the opening of the middle plate 201.

The carbon fiber reinforced resin composite material base body 211 is formed by a carbon fiber reinforced resin composite material, and the carbon fiber reinforced resin composite material includes, but is not limited to, a carbon fiber reinforced epoxy resin composite material, a carbon fiber reinforced phenolic resin composite material, or a carbon fiber reinforced polytetrafluoroethylene resin composite material, where the carbon fiber reinforced epoxy resin composite material has higher comprehensive performance indexes such as a specific strength and a specific modulus, so that the middle frame assembly have lighter weight and better strength as the base body.

In the carbon fiber reinforced resin composite material, a carbon fiber includes, but is not limited to, a continuous fiber or a short fiber, where the short fiber reinforced resin composite material is also referred to as a forged carbon fiber reinforced resin composite material, which has the advantages of high strength, short production cycle, being used on Grade A surfaces, and diversified surface treatment processes. In the short fiber reinforced resin composite material, an addition amount of the short fiber is not more than 50%, generally in a range of 10 wt % to 30 wt %. The continuous fiber is also referred to as a long fiber, and the continuous fiber reinforced resin composite material is generally prepared by soaking resin with dry fiber cloth and then hot pressing. A diameter of the continuous fiber is generally in a range of 2 μm to 5 μm, and each bundle of fibers is 10,000 to 20,000.

In a possible implementation, the carbon fiber reinforced resin composite material base body 211 may be provided with an opening for placing an element and a battery on the circuit board.

In a possible implementation, to increase a bonding force between the frame 202 and the middle plate 201, a notched structure or a meshing structure may be arranged on an outer periphery of the carbon fiber reinforced resin composite material base body 211. Alternatively, in other possible implementations, a carbon fiber reinforced resin composite material sidewall is formed on a portion of an outer periphery of the carbon fiber reinforced resin composite material base body 211, for example, an outer periphery of the middle plate 201 close to the battery, to increase a bonding force between the frame 202 and the middle plate 201.

The carbon fiber reinforced resin composite material serves as the base body of the middle plate 201, and a metal plating layer 212 is compounded on the surface of the carbon fiber reinforced resin composite material. After the metal plating layer 212 is compounded, the middle plate 201 is equivalent to the metal middle plate. When a current flows through the reference ground of the middle frame assembly, the current distribution inside the conductor is uneven based on a skin effect of electromagnetic waves, and the current concentrates on a thin layer (that is, a "skin" part) outside the conductor. The closer the conductor surface is, the higher the current density is, and an actual current inside the conductor is smaller. That is, when a thickness of the metal plating layer 212 is larger than a skin depth corresponding to the frequency, and a resistivity is similar to that of the metal, an effect of the metal plating layer 212 is similar to that of an ordinary metal middle frame, and there is no loss of antenna performance.

For example, when phosphorus copper is used as the metal plating layer 212, after a thickness of the phosphorus copper reaches the skin depth, performance deterioration <0.4 dB, which has little impact on antenna performance. Referring to FIG. 8 and FIG. 9, FIG. 8 is a system radiation efficiency curve of a metal plating layer and a metal material in a range of 1 GHz to 3 GHZ, and FIG. 9 is a system radiation efficiency curve of a metal plating layer and a metal material in a range of 3 GHZ to 6 GHZ, where curve 2 is a system radiation efficiency in dB [Magnitude] of aluminum alloy (Al content is over 80% and a resistivity is about $3 \times 10^{-7}$ ohm·cm), and curve 1 is a system radiation efficiency curve of a phosphorus copper plating layer (a resistivity is about $2 \times 10^{-7}$ ohm·cm). As can be seen from FIG. 8 and FIG. 9, when the thickness of the metal plating layer meets the skin depth, and the resistivity is equivalent to that of the metal material, the performance hardly deteriorates.

In another example, when a silver plating layer is formed with silver paste as the metal plating layer 212, after a thickness of the silver plating layer reaches a skin depth, because the resistivity of silver paste is higher than that of the metal material, the performance of the silver plating layer deteriorates, but the degree of deterioration is low, approximately in a range of 0.1 dB to 0.2 dB. Referring to FIG. 10 and FIG. 11, FIG. 10 is a S-parameters (S-parameters [Magnitude in dB]) curve of a silver plating layer and a metal material in a range of 0.6 GHZ to 4 GHZ, and FIG. 11 is a system radiation efficiency curve of a silver plating layer and a metal material in a range of 0.6 GHz to 4 GHZ, where curve 1 is a correlation curve of aluminum alloy (Al content is over 80%, and the resistivity is about $3 \times 10^{-7}$ ohm·cm), and curve 2 is a correlation curve of a silver plating layer (formed by silver paste, and the silver paste includes silver and silicone resin, and the resistivity is about $10^{-4}$ ohm·cm to $10^{-5}$ ohm·cm). As can be seen from FIG. 10 and FIG. 11, when the thickness of the metal plating layer meets the skin depth, and the resistivity is higher than that of the metal material, the performance deteriorates, but the degree of deterioration is low and within an acceptable range.

When the thickness of the metal plating layer 212 reaches the skin depth and the resistivity is less than $10^{-4}$ ohm·cm, there is little or no impact on the antenna performance. Specifically, the metal plating layer 212 may be an alloy of one or more of metals such as zinc, copper, nickel, gold, silver, tin, or aluminum, which is not specially limited in the embodiments of this application. The metal plating layer 212 may be a single plating layer, and the single plating layer may be a single metal layer or may be a metal alloy layer; and The metal plating layer 212 may further be a multi-layer metal plating layer, each layer of the multi-layer metal plating layer may be the same or different, and each layer of the multi-layer metal plating layer may be a single metal layer or a metal alloy layer. In a possible embodiment, the metal plating layer 212 is a single plating layer, for example, a zinc-copper plating layer or a copper plating layer, and a thickness of the metal plating layer is in a range of 30 μm to 40 μm; for example, a thickness of the copper plating layer is in a range of 6 μm to 18 μm; and for example, a thickness of the nickel plating layer is in a range of 2 μm to 8 μm. In a possible embodiment, the metal plating layer 212 is a multi-layer metal plating layer. For example, including sequentially compounded copper plating layer and nickel plating layer, or sequentially compounded copper plating layer, nickel plating layer, and gold plating layer, where a thickness of the copper plating layer may be in a range of 6 μm to 18 μm, a thickness of the nickel plating layer may be in a range of 2 μm to 8 μm, and a thickness of the gold plating layer may be in a range of 0.2 μm to 0.4 μm. In a possible embodiment, a thickness of the metal plating layer may be in a range of 12 μm to 20 μm.

An objective of the metal plating layer 212 is to make the carbon fiber reinforced resin composite material base body 211 equivalent to a metal. Therefore, the metal plating layer 212 may be formed on an entire surface of the carbon fiber reinforced resin composite material base body 211, or may be formed on a partial surface of the carbon fiber reinforced resin composite material base body 211, for example, the metal plating layer 212 is formed on a partial surface that is not connected to the frame 22. However, it should be noted that, when the metal plating layer 212 is formed on the partial surface of the carbon fiber reinforced resin composite material base body 211, the metal plating layers on an upper surface and a lower surface of the carbon fiber reinforced resin composite material base body 211 are required to be connected in a manner such as drilling or grooving at an edge of a portion connected to the frame 202, to ensure that the continuity of an electrical connection of the metal plating layer 212.

The frame 202 is disposed around an outer edge of the middle plate 201. In a possible implementation, the frame 202 includes a plastic frame 221 and a metallized frame 222 connected to the middle plate 201 through the plastic frame 221. FIG. 12 is a schematic structural diagram of a frame according to an embodiment of this application. The plastic frame 221 can reduce a weight of the electronic device on the one hand, and facilitate a connection between the metallized frame 222 and the middle plate 201 on the other hand. The connection between the frame 202 and the middle plate 201 includes, but is not limited to, welding, clamping, locking, and integral injection molding. A person skilled in the art may understand that, when a manner of connecting the frame 202 and the middle plate 201 is welding, clamping, or locking, a region or a slot is arranged on the middle plate 201 and the frame 202 for implementing the welding, clamping, or locking.

The plastic frame 221 is made of a plastic material, for example, polycarbonate (PC), acrylonitrile-butadiene-styrene (ABS), glass fiber reinforced polycarbonate (PC+GF), ABS reinforced polycarbonate (ABS+PC), or carbon fiber reinforced resin composite material. When the plastic frame 221 is made of the carbon fiber reinforced resin composite material, a body of the plastic frame 221 may be the same as or different from that of the carbon fiber reinforced resin composite material of the middle plate 21. The plastic frame

221 may be a closed annular structure or a semi-closed annular structure, or the plastic frame 221 may be a semi-frame structure. In this embodiment, the plastic frame 221 is a closed annular structure. In a possible embodiment, the plastic frame 221 is a semi-frame structure, and is located in a clearance area of the antenna radiator.

The metallized frame 222 is disposed around an outer edge of the plastic frame 221, and may be formed by a section of a frame body connected end to end, that is, the metallized frame is an integral frame, and may be formed by a plurality of sections of the frame body connected end to end in turn, or may be formed by a plurality of discontinuous sections of the frame body. In a possible embodiment, the metallized frame 222 may be a metal frame, including, but is not limited to, aluminum, aluminum-magnesium alloy, or the like. In other possible embodiments, the metallized frame 222 may be a plastic frame with a metal plating layer compounded on a surface. For example, glass fiber reinforced polycarbonate compounded with the metal plating layer on the surface, carbon fiber reinforced resin composite material compounded with the metal plating layer on the surface, or the like.

In other possible implementations, a frame 202 is a plastic frame; or the frame includes a plastic frame and a ceramic frame or a glass frame, and the ceramic frame or the glass frame is connected to the middle plate 201 through the plastic frame. A person skilled in the art may understand that, a manner of connecting and disposing the ceramic frame and the glass frame are similar to a manner of connecting and disposing the metallized frame 222 and the plastic frame described above, and details are not described again in this application.

In a possible implementation, in an electronic device, a side of the frame 202 facing away from the middle plate 201 may be a vertical panel. For example, a side of the metallized frame 222 facing outward may be perpendicular to a display screen. Alternatively, in an electronic device, a side of the metallized frame 222 facing outward is an outwardly arcuate surface, which is convenient for hand-holding the electronic device on the one hand, and makes an outer frame of the metallized frame 222 more beautiful on the other hand.

FIG. 13 is a flowchart of a preparation process of a middle frame assembly according to an embodiment of this application, and the middle frame assembly in the embodiments of this application is prepared according to the following steps:

Step 1): Process carbon fiber reinforced resin composite material to obtain a base body 211 of a middle plate 201 which can be used as a middle frame.

The carbon fiber reinforced resin composite material is the same as that described above, and details are not described again in this application. The carbon fiber reinforced resin composite material is processed through stamping or computer number control (Computer number control, CNC) to form the base body 211, and an opening for placing an element on a circuit board and a battery compartment for a battery may be formed on the base body. In a possible implementation, a notched structure or a meshing structure is arranged on an edge of the base body 211. Alternatively, in other possible implementations, a carbon fiber reinforced resin composite material sidewall is formed on a portion of an outer periphery of the carbon fiber reinforced resin composite material base body 211, to increase a bonding force between the frame 202 and the middle plate 201.

Step 2): Form a metal plating layer 212 on a surface of the carbon fiber reinforced resin composite material base body to obtain a middle plate; and the metal plating layer 212 may be formed by performing metallized surface treatment on a carbon fiber reinforced resin composite material base body 211. The metallized surface treatment includes, but is not limited to, spraying, metal spray pattern (Metal Spray Pattern, MSP), printing direct structuring (which is also referred to pad printing, printing direct structuring, PDS), laser direct structuring (Laser Direct Structuring, LDS), laser-activating-plating (Laser-Activating-Plating, LAP), or chemical plating. The metallized surface treatment methods are different, and adopted metals and formed metal plating layers are also different.

For example, a cold spraying uses compressed air to accelerate metal particles to a critical speed, and sprays the metal particles through a nozzle. After hitting the surface of the base body, the metal particles perform physical deformation, and after impact, the metal particles deform and firmly adhere to the surface of the base body. The whole process features a high speed and a low temperature, which have little thermal impact on the base body, and a dense plating. In a possible embodiment, a metal plating layer 212 is formed on the base body 211 through a cold spraying method, and the metal plating layer 212 may be a single metal plating layer of zinc, copper, nickel, gold, silver, tin, or an alloy plating layer formed by a plurality of metals. In a possible embodiment, the metal plating layer 212 is a single plating layer, for example, a zinc-copper plating layer or a copper plating layer, and a thickness of the metal plating layer is in a range of 30 μm to 40 μm; for example, a thickness of the copper plating layer is in a range of 6 μm to 18 μm; and for example, a thickness of the nickel plating layer is in a range of 2 μm to 8 μm. In a possible embodiment, the metal plating layer 212 is a multi-layer metal plating layer. For example, including sequentially compounded copper plating layer and nickel plating layer, or sequentially compounded copper plating layer, nickel plating layer, and gold plating layer, where a thickness of the copper plating layer may be in a range of 6 μm to 18 μm, a thickness of the nickel plating layer may be in a range of 2 μm to 8 μm, and a thickness of the gold plating layer may be in a range of 0.2 μm to 0.4 μm.

For example, PDS refers to an application of a principle of gravure printing, conductive ink including metal powder such as silver powder, copper powder, aluminum powder, and nickel powder is directly transferred by a pad printing device to the base body through pad, and the metal plating layer is formed after thermal curing. The conductive ink includes not only the metal powder, but also silicone resin, epoxy resin, and the like. In a possible embodiment, a resistivity of the conductive ink is in a range of $10^{-4}$ ohm·cm to $10^{-5}$ ohm·cm. In a possible embodiment, a thickness of the metal plating layer may be in a range of 12 μm to 20 μm. In a possible embodiment, a thickness of the metal plating layer may be in a range of 30 μm to 40 μm.

For example, chemical plating is a process in which a metal is deposited to form a metal plating layer through redox reaction under catalysis of the metal. In a possible embodiment, a metal plating layer 212 is formed on the base body 211 through a chemical plating method, and the metal plating layer 212 may be a single metal plating layer of zinc, copper, nickel, gold, or an alloy plating layer formed by a plurality of metals. In a possible embodiment, the metal plating layer 212 is a single plating layer, for example, a zinc-copper plating layer or a copper plating layer, and a thickness of the metal plating layer is in a range of 30 μm to 40 μm; for example, a thickness of the copper plating layer is in a range of 6 μm to 18 μm; and for example, a thickness of the nickel plating layer is in a range of 2 μm to 8 μm. In a possible embodiment, the metal plating layer 212 is a multi-layer metal plating layer. For example, including sequentially compounded copper plating layer and nickel plating layer, or sequentially compounded copper plating layer, nickel plating layer, and gold plating layer, where a thickness of the copper plating layer may be in a range of 6 μm to 18 μm, a thickness of the nickel plating layer may be in a range of 2 μm to 8 μm, and a thickness of the gold plating layer may be in a range of 0.2 μm to 0.4 μm.

Step 3): Connect the middle plate 201 to the frame 202.

Specifically, the middle plate 201 and the frame 202 may be connected in a mechanical manner such as welding, clamping, or the like, or may be connected through an integral injection molding.

In a possible implementation, the middle plate 201 is connected to the frame 202 through screw fastening. As shown in FIG. 14, FIG. 14 is a schematic structural diagram of a connection of a middle frame assembly according to an embodiment of this application. Corresponding screw holes are respectively arranged on the middle plate 201 and the frame 202, and a fastening connection between the middle plate 201 and the frame 202 is implemented through a nut 91. In this case, the frame 202 may be a preformed metal frame. In a possible embodiment, the nut 91 is a hot-melt nut and is bonded with the carbon fiber reinforced resin composite material base body 211 through a hot-melt adhesive 92, thereby implementing a higher locking strength between the middle plate 201 and the frame 202. In other possible embodiments, tapping may be directly performed on the carbon fiber reinforced resin composite material base body 211, or may be performed metallization after tapping on the carbon fiber reinforced resin composite material base body 211.

When the middle plate 201 is connected to the frame 202 through integral injection molding, the frame 202 may be a plastic frame or a composite frame including a plastic frame and a metallized frame or a glass frame or a ceramic frame. The integral injection molding may include nano molding technology (Nano Molding Technology, NMT) or metal device antenna (Metal Device Antenna, MDA).

A Typical NMT Process is:

The middle plate 201 including a metal plating layer and a carbon fiber reinforced resin composite material base body is processed to etch a honeycomb-shaped nano-pore with a smaller size on the surface of the metal plating layer, and then perform injection molding with plastic particles and a metal frame, a glass frame or a ceramic frame to obtain the middle frame assembly.

Compared with an NMT treatment with a metal middle plate directly, the NMT treatment with the middle plate includes a metal plating layer and a carbon fiber reinforced resin composite material base body that are not required for stamping treatment (that is, a molding treatment), and injection molding is performed by etching honeycomb nano-holes with a smaller size on the surface of the metal plating layer directly through T treatment and E treatment. When the frame is a plastic frame, the middle plate may be directly injected with plastic particles; when the frame is a composite frame including a plastic frame and a metallized frame or a glass frame or a ceramic frame, and during injection molding, the plastic particles are used to inject the metallized frame, the glass frame, or the ceramic frame into an integrated structure.

A Typical MDA Process is:

The middle plate 201 including a metal plating layer and a carbon fiber reinforced resin composite material base body is processed to etch a honeycomb-shaped nano-pore with a smaller size on the surface of the metal plating layer, and then perform injection molding with plastic particles and a metal frame, a glass frame or a ceramic frame to obtain the middle frame assembly.

Compared with an MDA treatment with a metal middle plate, the MDA treatment with the middle plate including metal plating layer and the carbon fiber reinforced resin composite material base body that are not required for die casting and punching treatment, and injection molding is performed directly. When the frame is a plastic frame, the middle plate may be directly injected with plastic particles; when the frame is a composite frame including a plastic frame and a metallized frame or a glass frame or a ceramic frame, and during injection molding, the plastic particles are used to inject the metallized frame, the glass frame, or the ceramic frame into an integrated structure.

In a possible implementation, a plastic particle used for injection molding includes, but is not limited to, polycarbonate (PC), acrylonitrile-butadiene-styrene (ABS), glass fiber reinforced polycarbonate (PC+GF), ABS reinforced polycarbonate (ABS+PC), or carbon fiber reinforced resin composite material.

To implement signal transmission and reception, at least one antenna assembly is arranged in an electronic device, where the antenna assembly includes an antenna radiator and a feed point and a ground point electrically connected to the antenna radiator. In the embodiments of this application, the antenna radiator is arranged on the middle frame assembly. As shown in FIG. 15, FIG. 15 is a schematic structural exploded view of the middle frame assembly according to a second embodiment of this application. The middle plate 301 is connected to the metallized frame 322 through the plastic frame 321, and at least a portion of a frame body of the metallized frame 322 is used as the antenna radiator 324. The metallized frame 322 has a plurality of slots 323 that are used as antenna slots for spacing apart two adjacent antenna radiators.

The feed point (not shown in the figure) of the antenna assembly may be located on a circuit board (not shown in the figure), and electrically connected to a radio frequency chip or a main chip (not shown in the figure) on the circuit board through a feed. The feed feeds a high frequency current to each antenna radiator 324 through the feed point, and the high frequency current is emitted outward in a form of an electromagnetic wave on the antenna radiator. Because a ground point of the circuit board is electrically connected to the middle plate 301, one end of the ground point of the antenna assembly is electrically connected to the antenna radiator, and the other end of the ground point of the antenna assembly is electrically connected to the middle plate 301 to implement grounding.

In a possible implementation, the antenna radiator 324 is electrically connected to the metal plating layer of the middle plate 301 through a conductive layer 325, and the conductive layer 325 electrically connects the antenna radiator 324 to the metal plating layer of the middle plate 301, to implement grounding of the antenna radiator 324. The conductive layer 325 may be formed in a manner such as ultrasonic welding, silver paste printing, or spraying, and the manner is not specially limited in the embodiments of this application. In a possible implementation, the metal frame 322 and the plastic frame 321 are connected to the middle plate 301 through injection molding. The metal frame 322 is processed to form the antenna slot 323 and the antenna radiator 324, and then the conductive layer 325 is formed on the metal plating layer of the middle plate 301 and the antenna radiator 324 through silver paste printing, thereby implementing the grounding of the antenna radiator 324.

In other possible implementations, the antenna radiator 424 is electrically connected to the metal plating layer 412 of the middle plate 401 through a conductive auxiliary material, such as a metal elastic piece, to implement the grounding of the antenna radiator 424. As shown in FIG. 16, FIG. 16 is a schematic structural exploded view of a middle frame assembly according to a third embodiment of this application. Corresponding screw holes are respectively arranged on the middle plate 401 and the frame 402, and a fastening connection between the middle plate 401 and the frame 402 is implemented through a nut 131. The metal elastic piece 425 is arranged between the antenna radiator 424 and the metal plating layer of the middle plate 401, to implement an electrical connection between the antenna radiator and the middle plate 401. The metal elastic piece 425 may be one, or may be two or more. When there are a plurality of metal elastic pieces, the plurality of metal elastic pieces are electrically connected.

In some possible implementations, the metal elastic piece 425 may be electrically connected in a spot welded manner, and a welding region is arranged on the antenna radiator 424. In some possible implementations, the metal elastic piece 425 may be in a form of a double-sided convex hull gasket, for example, a group of four convex hulls. Two convex hulls facing the antenna radiator 424 are in contact with the antenna radiator 424, and the other two convex hulls facing the metal plating layer 412 are connected to the metal plating layer 412, to implement an electrical connection between the antenna radiator 424 and the middle plate 401.

When the metal elastic piece 425 is used for the electrical connection, to reduce a contraction resistance of the metal elastic piece 425, a clamping force between the middle plate 401 and the frame 402 needs to be more than 100 N. When a contact pressure increases, two contact surfaces move closer to each other, and a quantity of contact spots increases accordingly, so that a real contact area increases and the contraction resistance decreases. In addition, deformation of some contact spots changes from elastic deformation to plastic deformation, which makes the contact surface permanently flattened, and can also reduce the contraction resistance of the metal elastic piece. Table 4 is changes of a contraction resistance caused by a contact form of a metal elastic piece.

TABLE 4

| Changes of a contraction resistance caused by a contact form of a metal elastic piece | | |
| --- | --- | --- |
| | Rc (mΩ) | |
| Contact form | F = 9.8N | F = 980N |
| Point contact | 0.23 | 0.023 |
| Line contact | 0.33 | 0.015 |
| Surface contact | 1.9 | 0.001 |

In other possible implementations, an antenna radiator 424 may further be electrically connected to a metal plating layer of a middle plate 401 through a convex hull, a conductive fabric, a conductive adhesive, or a conductive foam.

In other possible implementations, FIG. 17 is a schematic diagram of a connection between an antenna radiator and a PCB according to an embodiment of this application; and the antenna radiator 1701 may be electrically connected to the PCB 1703 through an elastic piece 1702. The elastic piece 1702 may be one, two, or more, and an electrical connection is implemented through the PCB, which saves costs of a structure. Alternatively, FIG. 18 is a schematic diagram of a connection between an antenna radiator and a screen component according to an embodiment of this application; and the antenna radiator 1801 may be electrically connected to a metal frame or copper foil of a screen 1803 through a foam 1802.

In the embodiments of this application, there is a plurality of antenna assemblies, including a main antenna and a parasitic antenna; or including a low frequency antenna (700 MHz to 960 MHz), an intermediate frequency antenna (1.71 GHz to 2.2 GHZ), a medium and high frequency antenna (1.805 GHz to 2.69 GHz), and a high frequency antenna (2.3 GHz to 2.69 GHZ), and may further include an antenna in frequency bands of 3300 MHz to 3600 MHz and 4800 MHZ to 5000 MHz. The antenna assembly may further include a WIFI antenna, a global positioning system (Global Positioning System, GPS) antenna, or a Bluetooth antenna.

When at least a portion of a frame body of the metallized frame is used as the antenna radiator, the antenna radiator may be formed by processing after the frame including the metal frame and the plastic frame and the middle plate are molded, or may be formed by electroplating, laser engraving, or printing after the plastic frame and the middle plate are firstly connected. In the embodiments of this application, a material of the antenna radiator includes, but is not limited to, silver, gold, nickel, stainless steel, and the like.

In other possible implementations, an antenna radiator in an antenna assembly is arranged on a side of a plastic frame facing a middle plate, that is, the antenna radiator is arranged inside of the plastic frame. In this case, the antenna radiator may be formed by integral injection molding with the plastic frame and the middle plate.

When the frame is connected to the middle plate including the metal plating layer and the carbon fiber reinforced resin composite material base body in a manner of integrally injection molding, an injection pressure is approximately in a range of 50 MPa to 100 MPa, and a joint surface of the metal plating layer and a plastic particle on the middle plate is subjected to great pressure during the injection molding, which leads to peeling of the metal plating layer on the middle plate and has an impact on antenna performance or conductivity performance of the electronic device.

To prevent the metal plating layer on the middle plate from falling off, the middle frame assembly provided in the embodiments of this application may be added with a protective layer. FIG. 19 is a schematic structural exploded view of a middle frame assembly according to a fourth embodiment of this application. The carbon fiber reinforced resin composite material base body 511, the metal plating layer 512 compounded on a surface thereof, and the protective layer 513 compounded on the surface of the metal plating layer constitute the middle plate 501, and the frame 502 is connected to the middle plate 501. When the middle plate 501 is connected to the frame 502, the protective layer 513 is arranged on the surface of the metal plating layer 512, which can prevent the metal plating layer 512 from falling off.

In this embodiment, the carbon fiber reinforced resin composite material base body 511, the metal plating layer 512 compounded on the surface thereof, and the frame 502 are described above, and details are not described again in this application. The protective layer 513 may be a metal oxide protective layer, a paint protective layer, or a paint protective layer, and is used to passivate the metal plating layer 512 and prevent the metal plating layer 512 from falling off.

The protective layer 513 may be arranged on an entire surface of the metal plating layer 512, or may be arranged on a portion of the surface, for example, the protective layer 513 may be arranged on a portion connected to the frame 502. The protective layer 513 arranged on a portion of the surface does not require a thickness of the metal plating layer without the protective layer, which is beneficial to reduce a weight of the electronic device.

Generally, the protective layer 513 may be formed by using surface coating treatment, passivation liquid treatment, spraying, anodic oxidation, micro-arc oxidation, or electrophoresis. Specifically, the surface coating treatment refers that the middle plate 501 including the metal plating layer 512 and the carbon fiber reinforced resin composite material base body 511 is performed chemical dipping treatment to form an antioxidative protective layer on the surface of the metal plating layer 512, where the chemical dipping treatment may be phosphoric acid treatment, manganate treatment, or vanadate treatment, which is not specifically limited in this application.

The passivation liquid treatment is similar to the surface coating treatment, and the difference lies in that the middle plate 501 including the metal plating layer 512 and the carbon fiber reinforced resin composite material base body 511 is performed passivation in passivation solution, and a thin protective film is formed on the surface of the metal plating layer 512 to isolate the metal plating layer from an external medium, so that the metal plating layer is prevented from falling off and being corroded at the same time.

The spraying treatment is to disperse paint or other covering into uniform and fine droplets with the help of pressure or centrifugal force through a spray gun or dish vaporizer, and apply the paint or other covering to the surface of metal plating layer 512 to form a protective layer.

The anodic oxidation refers that the middle plate 501 including the metal plating layer 512 and the carbon fiber reinforced resin composite material base body 511 is used as an anode to perform electrolysis in the electrolyte, so that an oxide film is formed on the surface of the metal plating layer 512, to protect the metal plating layer 512.

The micro-arc oxidation, which is also referred to plasma electrolytic oxidation (PEO). In the electrolyte, under an instantaneous high temperature and high pressure generated by arc discharge, a modified ceramic plating layer mainly composed of metal oxide and supplemented by electrolyte components is grown on the surface of metal plating layer 512 as a protective layer, to protect the metal plating layer 512.

In the electrophoresis, the middle plate 501 including the metal plating layer 512 and the carbon fiber reinforced resin composite material base body 511 is used as a cathode. Under an action of a voltage, the electrophoresis coating reacts with the surface of the metal plating layer 512 to form an insoluble substance, which is deposited on the surface of the metal plating layer 512, to protect the metal plating layer 512.

In a possible implementation, in this application, the metal plating layer is not compounded on a portion where the middle plate and the frame are combined, to prevent the metal plating layer from falling off and have an impact on the performance of the middle frame. As shown in FIG. 20, FIG. 20 is a schematic structural exploded view of a middle frame assembly according to a fifth embodiment of this application. The middle plate 601 includes a carbon fiber reinforced resin composite material base body 611 and a metal plating layer 612, the metal plating layer 612 is compounded on a surface of the carbon fiber reinforced resin composite material base body 611 which is not in contact with a frame 602, and the frame 602 is directly connected to the carbon fiber reinforced resin composite material base body 611. That is, the metal plating layer 612 is not compounded on the surface of the carbon fiber reinforced resin composite material base body 611 at a portion where the middle plate 601 is in contact with the frame 602, and the metal plating layer 612 is compounded only on the portion where the middle plate 601 is not in contact with the frame 602. To implement continuity of an electrical connection of the metal plating layer on the upper and lower surfaces of the carbon fiber reinforced resin composite material base body 611, at an edge of the metal plating layer 612, that is, an edge of a portion where the frame 602 is directly connected to the carbon fiber reinforced resin composite material base body 611, a through hole 613 is formed in the carbon fiber reinforced resin composite material base body 611, so that a metal plating layer on the upper surface and a metal plating layer on the lower surface of the carbon fiber reinforced resin composite material base body 611 are implemented the continuity of the electrical connection in a manner of compounding the metal plating layer and connecting the metal plating layer to the metal plating layer 612. There may be a plurality of through holes 613, as shown in FIG. 21, and there may be one, as shown in FIG. 22. In other possible implementations, continuity of an electrical connection may further be implemented in a manner of connecting a conductive material to the metal plating layer 612, for example, a metal sheet or a conductive ink, on the through hole 613.

In another possible implementation, the metal plating layer 714 may further be directly compounded at an edge of a portion where the frame 702 is directly connected to the carbon fiber reinforced resin composite material base body 711, so that a metal plating layer on the upper surface and a metal plating layer on the lower surface of the carbon fiber reinforced resin composite material base body 711 are implemented the continuity of the electrical connection, as shown in FIG. 23. The middle plate 701 includes a carbon fiber reinforced resin composite material base body 711 and a metal plating layer 712, the metal plating layer 712 is compounded on a surface of the carbon fiber reinforced resin composite material base body 711 which is not in contact with a frame 702, and the frame 702 is directly connected to the carbon fiber reinforced resin composite material base body 711. That is, the metal plating layer 712 is not compounded on the surface of the carbon fiber reinforced resin composite material base body 711 at a portion where the middle plate 701 is in contact with the frame 702, and the metal plating layer 712 is compounded only on the portion where the middle plate 701 is not in contact with the frame 702. To implement continuity of an electrical connection of the metal plating layer 712 on the upper and lower surfaces of the carbon fiber reinforced resin composite material base body 711, the metal plating layer 714 is directly compounded on a portion where the frame 702 is connected to the carbon fiber reinforced resin composite material base body 711, so that a metal plating layer on the upper surface and a metal plating layer on the lower surface of the carbon fiber reinforced resin composite material base body 711 are implemented the continuity of the electrical connection. In other possible implementations, a conductive sheet may further be directly connected, so that a metal plating layer on the upper surface and a metal plating layer on the lower surface of the carbon fiber reinforced resin composite material base body 711 are implemented the continuity of the electrical connection.

In a possible implementation, when an antenna assembly is required to be coupled with a metal reference ground, in this application, a second metal plating layer may be further compounded on a portion where a middle plate and a frame are combined, as shown in FIG. 24. The middle plate 801 includes a carbon fiber reinforced resin composite material base body 811 and a metal plating layer 812, the metal plating layer 812 is compounded on a surface of the carbon fiber reinforced resin composite material base body 811 which is not in contact with a frame 802, and the frame 802 is directly connected to the carbon fiber reinforced resin composite material base body 811. That is, the metal plating layer 812 is not compounded on the surface of the carbon fiber reinforced resin composite material base body 811 at a portion where the middle plate 801 is in contact with the frame 802, and the metal plating layer 812 is compounded only on a portion where the metal plating layer 812 is not in contact with the frame 802, to prevent the metal plating layer 812 from falling off at a contact portion during subsequent injection molding. At an edge of the metal plating layer 812, that is, an edge of a portion where the frame 802 is directly connected to the carbon fiber reinforced resin composite material base body 811, a through hole 813 is formed in the carbon fiber reinforced resin composite material base body 811, so that a metal plating layer on the upper surface and a metal plating layer on the lower surface of the carbon fiber reinforced resin composite material base body 811 are implemented the continuity of the electrical connection in a manner of compounding the metal plating layer. There may be a plurality of through holes 813, or there may be one. A second metal plating layer 814 is compounded at an edge of a portion where the frame 802 is connected to the middle plate 801, to facilitate a metal reference ground coupling of an antenna assembly.

To further reduce the weight of the electronic device, in a fifth embodiment of this application, FIG. 25 is a schematic structural diagram of a middle frame assembly according to a sixth embodiment of this application. The middle frame assembly includes a middle plate 901 and a frame 902, and the middle plate 901 includes a first carbon fiber reinforced resin composite material base body and a first metal plating layer compounded on the first carbon fiber reinforced resin composite material base body; and the frame 902 includes a plastic frame 921 and a metallized frame 922 connected to the middle plate 901 through the plastic frame 921. The metallized frame includes a second carbon fiber reinforced resin composite material base body and a second metal plating layer compounded on the second carbon fiber reinforced resin composite material base body, that is, the middle plate 901 and the frame 902 are both formed by the carbon fiber reinforced resin composite material compounded with the metal plating layer, which has high strength and low weight at the same time. At least a portion of the frame body of the metallized frame 922 forms an antenna radiator, and the antenna radiator is connected to the middle plate 901 through the conductive layer. The arrangement of the antenna radiator and the conductive layer may be referred to the description above, and details are not described again in the present disclosure.

It should be understood that, the electronic device mentioned in this application may be any device with communication and storage functions. For example, a smart phone, a cellular phone, a cordless phone, a session initiation protocol (Session Initiation Protocol, SIP) phone, a tablet computer, a personal digital assistant (Personal Digital Assistant, PAD), a notebook computer, a digital camera, an electronic book reader, a portable multimedia player, a handheld device with a wireless communication function, a computing device or another processing device connected to a wireless modem, an in-vehicle device, a wearable device, a 5G terminal device, or the like, which is not limited in this application.

The foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A middle frame assembly, comprising:
a middle plate; and
a frame disposed around an outer edge of the middle plate, wherein the middle plate includes a base body comprising first carbon fiber reinforced resin composite material and a first metal plating layer compounded on a surface of the base body;
wherein a first part of the base body that is not connected to the frame is compounded with the first metal plating layer; and
wherein a second part of the base body that is connected to the frame is compounded with a second metal plating layer, and the second metal plating layer is connected to the first metal plating layer.

2. The middle frame assembly according to claim 1, wherein a thickness of the first metal plating layer is greater than or equal to a skin depth of the first metal plating layer.

3. The middle frame assembly according to claim 2, wherein a resistivity of the first metal plating layer is $1\times10^{-4}$ ohm·cm or below.

4. The middle frame assembly according to claim 3, wherein the resistivity of the first metal plating layer is in a range of $1\times10^{-5}$ ohm·cm to $1\times10^{-8}$ ohm·cm.

5. The middle frame assembly according to claim 4, wherein the first metal plating layer is selected from one of zinc, copper, nickel, gold, silver, tin, or aluminum, or an alloy thereof.

6. A middle frame assembly, comprising:
a middle plate; and
a frame disposed around an outer edge of the middle plate, wherein the middle plate includes a base body comprising first carbon fiber reinforced resin composite material and a first metal plating layer compounded on a surface of the base body;
wherein a part of the base body that is not connected to the frame is compounded with the first metal plating layer; and
wherein a through hole is provided on the base body, a second metal plating layer is compounded on a surface of the through hole, and the second metal plating layer is connected to the first metal plating layer.

7. The middle frame assembly according to claim 1, wherein the middle plate further comprises a protective layer compounded on a surface of the first metal plating layer.

8. The middle frame assembly according to claim 1, further comprising an antenna radiator arranged on the frame.

9. The middle frame assembly according to claim 8, wherein the frame comprises a plastic frame and a metallized frame, wherein the metallized frame is connected to the middle plate through the plastic frame.

10. The middle frame assembly according to claim 8, wherein the frame comprises a plastic frame and a metallized frame, wherein the metallized frame is connected to the middle plate through the plastic frame, wherein the metallized frame comprises a third carbon fiber reinforced resin composite material base body and a third metal plating layer compounded on the third carbon fiber reinforced resin composite material base body.

11. The middle frame assembly according to claim 9, wherein at least a portion of a frame body of the metallized frame is used as the antenna radiator.

12. The middle frame assembly according to claim 11, wherein the antenna radiator is electrically connected to the middle plate through a conductive layer.

13. The middle frame assembly according to claim 11, wherein the antenna radiator is electrically connected to the middle plate through a conductive auxiliary material.

14. The middle frame assembly according to claim 13, wherein the conductive auxiliary material is a metal elastic piece, a metal gasket, a conductive fabric, a conductive adhesive, or a conductive foam.

15. The middle frame assembly according to claim 8, wherein the antenna radiator is arranged on one side of the frame facing the middle plate.

16. The middle frame assembly according to claim 15, wherein the antenna radiator is electrically connected to the middle plate through a conductive layer.

17. The middle frame assembly according to claim 15, wherein the antenna radiator is electrically connected to the middle plate through a conductive auxiliary material.

18. The middle frame assembly according to claim 1, wherein the base body comprises a carbon fiber reinforced epoxy resin composite material base body, a carbon fiber reinforced phenolic resin composite material base body, or a carbon fiber reinforced polytetrafluoroethylene resin composite material base body.

19. An electronic device comprising a middle frame assembly, wherein the middle frame assembly includes:
a middle plate; and
a frame disposed around an outer edge of the middle plate, wherein the middle plate includes a base body comprising first carbon fiber reinforced resin composite material and a first metal plating layer compounded on a surface of the base body;
wherein a first part of the base body that is not connected to the frame is compounded with the first metal plating layer; and
wherein a second part of the base body that is connected to the frame is compounded with a second metal plating layer, and the second metal plating layer is connected to the first metal plating layer.

* * * * *